United States Patent [19]
Hainey

[11] Patent Number: 5,583,785
[45] Date of Patent: Dec. 10, 1996

[54] METHOD AND APPARATUS FOR SIGNAL DECODER USING INSTANTANEOUS MAGNITUDE AND PHASE DETECTION

[75] Inventor: Herbert W. Hainey, Arlington, Wash.

[73] Assignee: Talkie Tooter, Inc., Sedro Woolley, Wash.

[21] Appl. No.: 175,215

[22] Filed: Dec. 28, 1993

[51] Int. Cl.$^6$ ............................ H04L 27/16; H04L 27/14
[52] U.S. Cl. .................. 364/486; 324/76.57; 324/76.54; 340/825.71; 340/825.48
[58] Field of Search ...................... 340/825.16, 825.48; 324/78 D, 78 R, 72, 76.57, 76.54; 364/486; 455/38.5

[56] References Cited

U.S. PATENT DOCUMENTS

| | | | |
|---|---|---|---|
| 4,197,525 | 4/1980 | Biery, Jr. et al. | 340/171 PF |
| 4,216,463 | 8/1980 | Backof, Jr. | 340/171 R |
| 4,231,018 | 10/1980 | Imigawa et al. | 340/825.71 |
| 4,313,107 | 1/1982 | Mori | 340/825.71 |
| 4,370,650 | 1/1983 | Norrell | 340/825.71 |
| 4,599,495 | 7/1986 | Richards | 340/825.71 |
| 4,675,614 | 6/1987 | Gehrke | 328/133 |
| 4,879,527 | 11/1989 | Geile et al. | 331/1 A |
| 4,910,465 | 3/1990 | Dillman | 328/133 |
| 4,920,278 | 4/1990 | Nawata | 307/262 |
| 5,007,069 | 4/1991 | VanEss | 375/80 |
| 5,022,048 | 6/1991 | Kingston et al. | 375/1 |

*Primary Examiner*—Emanuel T. Voeltz
*Assistant Examiner*—Kamini S. Shah
*Attorney, Agent, or Firm*—Christensen, O'Connor, Johnson & Kindness PLLC

[57] ABSTRACT

Disclosed is a tone decoder (20) that identifies one or more tones encoded on an RF carrier signal for use in controlling various systems and devices located at a remote site. The tone decoder includes a bandpass filter (22), an A/D converter (24), and a tone detection component (26). An input signal having a nominal frequency $f_{in}$ is received by the tone decoder, filtered, and then converted to digital form for subsequent digital processing by the tone detection component. The tone detection component compares the input signal to a reference signal having a frequency $f_r$. The tone detection component mixes the input signal with cophase versions of the reference signal to produce a cophase difference signal. The cophase difference signal is used to calculate the instantaneous magnitude and instantaneous phase of the mixed input and reference signal pairing. An indication of the frequency of the difference signal is determined by differentiating the instantaneous phase. The instantaneous magnitude and frequency calculations are then compared against threshold values to determine (a) the presence of a valid input signal and (b) whether the actual frequency $f_{in}$ of the input signal sufficiently corresponds to the frequency $f_r$ of the reference signal to indicate the presence of a tone.

28 Claims, 8 Drawing Sheets

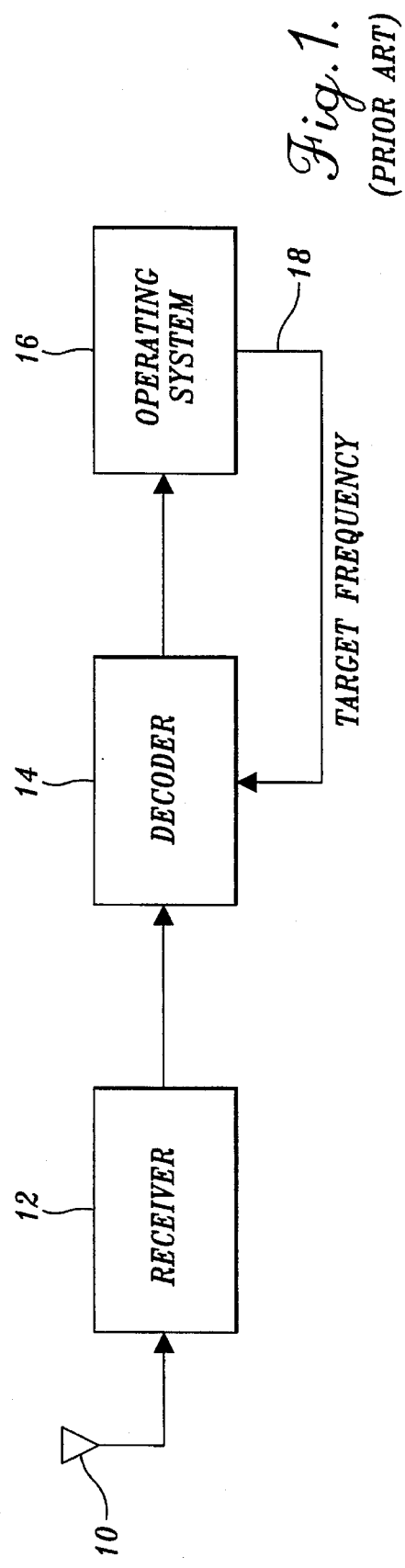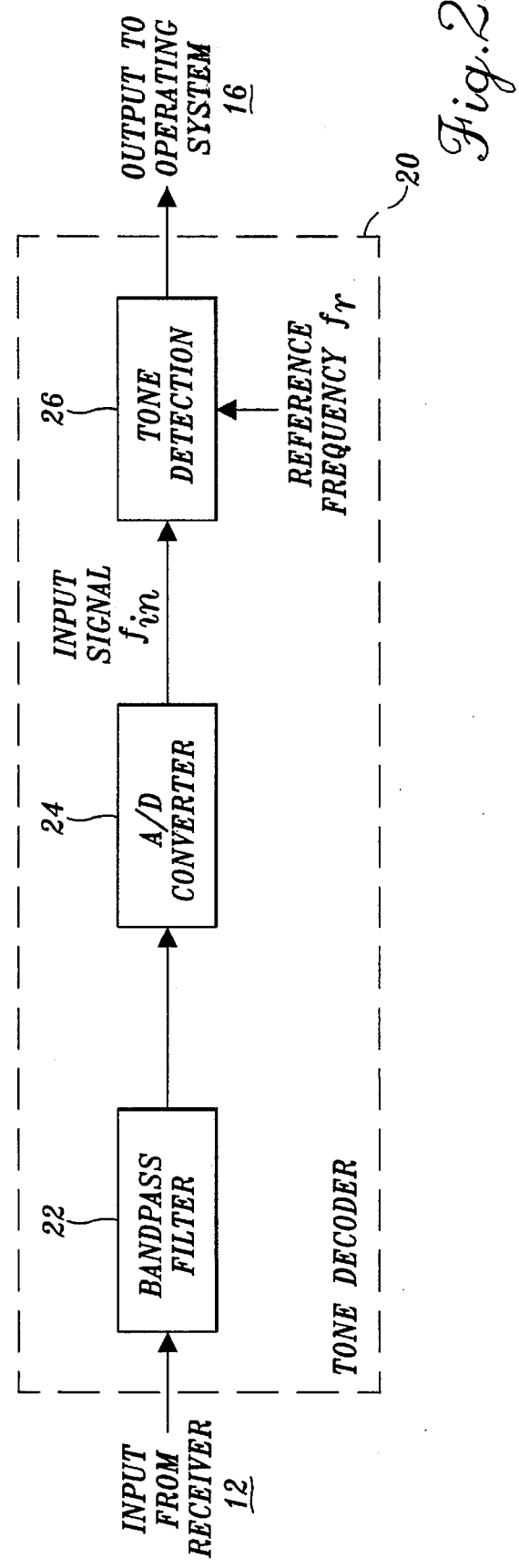

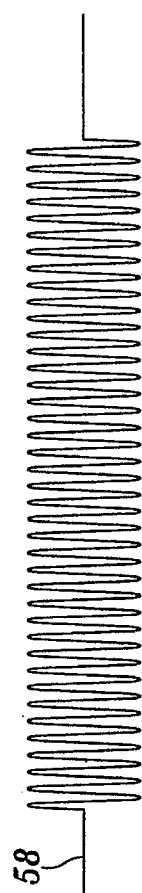
Fig. 4A  INPUT SIGNAL
Fig. 4B  SIN REF SIGNAL
Fig. 4C  INPUT TO SIN LP FILTER
Fig. 4D  OUTPUT OF SIN LP FILTER
Fig. 4E  COS REF SIGNAL
Fig. 4F  INPUT TO COS LP FILTER
Fig. 4G  OUTPUT OF COS LP FILTER

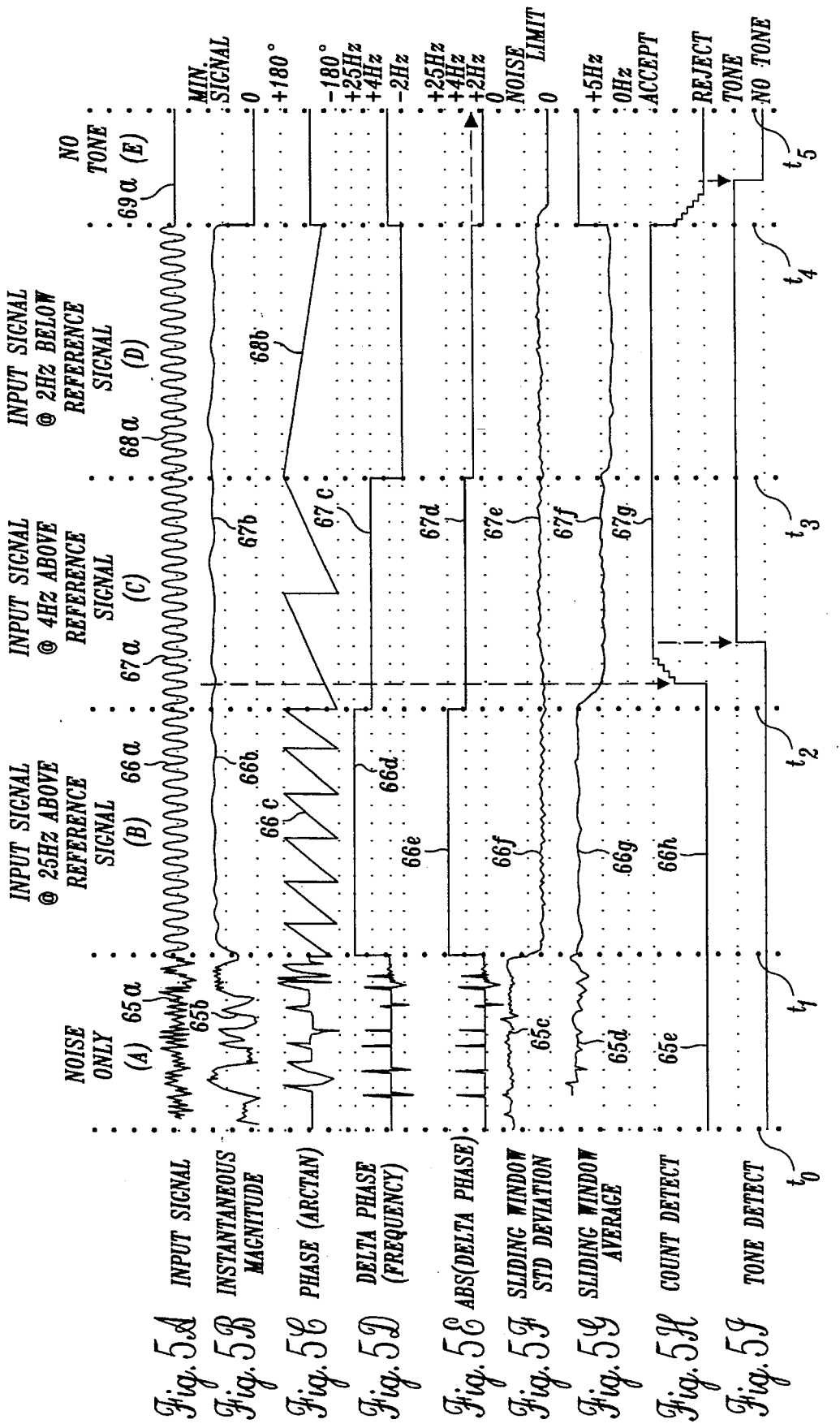

METHOD AND APPARATUS FOR SIGNAL DECODER USING INSTANTANEOUS MAGNITUDE AND PHASE DETECTION

FIELD OF THE INVENTION

The invention relates generally to the field of communications systems and, more particularly, to a method and apparatus for decoding signals that are encoded using one or more tones of a specified frequency.

BACKGROUND OF THE INVENTION

The use of remote control to effect a desired operation of various systems and devices is relatively widespread. For example, inaccessible or inconveniently located systems are particularly suited For remote control. Similarly, when a number of widely dispersed systems are involved, remote control can be used to provide the desired operation of each system from a single control point. In either case, control is easily achieved with a minimum of operator time, thus reducing system operating costs.

One way in which reliable remote control has been achieved is with the aid of communication systems. Such communication systems produce a suitably encoded signal, usually by modulating one or more tones of specified frequency and duration onto an appropriate radio frequency (RF) carrier wave, and transmitting the signal to a remote system to be controlled. The encoded signal is received by the remote system and demodulated, with the resultant tones being applied to a decoder. The decoder produces an output signal that effects a change in the operation of the remote system only upon receipt of one or more tones having the specified frequency and duration. Otherwise, the operational status of the remote system remains unchanged.

One particular type of communication system that has found widespread commercial acceptance in the logging industry employs an encoded signal commonly identified as a "two-tone sequential" signal. The encoded signal is used to effect the remote actuation of a whistle or other signaling device to indicate to personnel information concerning the operation of logging equipment. The assignee of the present application has a number of patents related to two-tone sequential systems. Two of such patents include: U.S. Pat. No. 27,044, directed toward a "Two-Tone Remote Control System," issued Feb. 2, 1971 to Rothenbuhler et al. and U.S. Pat. No. 4,197,525, directed toward a "Tone Decoder," issued Apr. 8, 1980 to Biery, Jr. et al.

The operation of the systems disclosed in the above-referenced patents may be described briefly as follows. A first tone of limited duration and of a specified frequency is modulated upon an RF carrier by a transmitter. Immediately following the termination of the first tone, a second tone having a specified frequency that is different from the frequency of the first tone is modulated upon the RF carrier. The duration of the second tone is equal to the desired actuation time of the remote signaling device and the frequency of both tones is typically in the audible frequency range.

At the location of the whistle, signals having the frequency of the RF carrier are received and demodulated. The demodulated signals are then applied to a decoder. The function of the decoder is to first identify the occurrence of a demodulated signal having a frequency corresponding to the nominal frequency of the first tone. In that event, the decoder continues to monitor the demodulated signal for the occurrence of a signal having a frequency corresponding to the nominal frequency of the second tone. The decoder provides an output signal to the whistle when the frequency of the demodulated signal corresponds to that of the second tone, but only if such a demodulated signal is detected within a predetermined period of time following detection of the first tone. Such a "two-tone sequential" system provides reliable, remote actuation of the whistle, even in the presence of encoded signals used in other communication systems that may have the same RF carrier modulated with a single tone at the nominal frequency of either the first or the second tone.

Another patent issued to the assignee of the present invention that also relates to two-tone sequential decoding systems is U.S. Pat. No. 5,007,069, titled "Decoding of Signals Using Cophase and Differential Signal Detection," and issued Apr. 9, 1991 to VanEss. VanEss discloses a decoder for producing an output signal when a receiver receives signals that fall within a predetermined pass band, i.e., a range of frequencies bounded by upper and lower frequencies $f_1$ and $f_2$. The decoder includes a tone detector having a cophase tone detection circuit and a differentiating tone detection circuit. The combination of cophase and differentiating tone detection enhances both the speed and accuracy of decoder. With reference to FIG. 3 of VanEss, a cophase reference signal R, having a frequency $f_r$ corresponding to the tone to be detected, is produced. Both phases of the cophase reference signal are mixed with an input signal received by the receiver having a frequency $f_i$, with the resultant signals containing information regarding a frequency difference $\Delta f$ that is equal to the $|f_i-f_r|$. This output, in the form of triangular waveforms, is supplied separately to both the cophase and differentiating tone detection circuits.

The cophase detection circuit determines whether $\Delta f$ is less than a predetermined first cutoff frequency $f_{c1}$. This step is accomplished by determining if the triangular input waveform is present within a window covering the frequency range zero to $f_{c1}$ Hz. The differentiating tone detection circuit produces a derivative-based confirmation of $\Delta f$. An output is produced from the circuit if the derivative of $\Delta f$ is less than a predetermined second cutoff frequency $f_{c2}$; or if $\Delta f$ is greater than $f_{c1}$. A single tone detector output is then produced if the difference $\Delta f$ between the frequency $f_i$ of the input signal and the frequency $f_r$ of each phase of the cophase reference signal is less than both cutoff frequencies $f_{c1}$ and $f_{c2}$.

As will be appreciated from the preceding discussion, much effort has been expended to provide a tone decoder that is able to detect tones with a high level of precision. More particularly, while the use of "two-tone sequential" encoding is designed to minimize the unintended actuation of a remote system or device, the effectiveness of any encoding technique is proportional to the ability of the decoder to precisely identify one or more tones in sequence. Further, it is typically advantageous that the decoder respond quickly to encoded information to avoid undue delay in the control of the remote system. It would be desirable to provide a decoder that is able to both quickly and accurately identify one or more tones encoded upon a carrier wave to accomplish remote control objectives with even greater speed and accuracy.

SUMMARY OF THE INVENTION

The present invention is a method and apparatus for determining whether the frequency $f_{in}$ of an input signal is within a frequency range surrounding the frequency $f_r$ of a reference signal. To make this determination, the method and apparatus initially rely upon the creation of a difference signal having a frequency that is equal to the difference between the frequencies $f_{in}$ and $f_r$. Once the difference signal has been generated, three conditions are evaluated to determine whether the frequency of the input signal falls within the desired frequency range. In evaluating the first condition, the instantaneous magnitude of the difference signal is calculated and compared with a minimum signal level. The instantaneous magnitude must exceed the minimum signal level for the first condition to be satisfied.

The remaining two conditions relate to the instantaneous phase of the difference signal. The arc tangent of the difference signal is calculated to arrive at the instantaneous phase of the signal. The instantaneous phase of the signal is then differentiated to arrive at a differential signal representative of the frequency difference between the input signal and the reference signal. In evaluating the second condition, the standard deviation of the differential signal is calculated and compared with a noise limit. The second condition is satisfied if the standard deviation of the differential signal over a selected period of time remains less than the noise limit. To evaluate the third condition, an average of the differential signal is calculated and compared with a frequency limit. The third condition is satisfied if the average of the differential signal remains below the preselected frequency limit. The standard deviation and average may be computed on a sliding window basis.

In order for the input signal to be found to fall within the desired range around the reference frequency, all three conditions must be satisfied. That is, the instantaneous magnitude of the difference signal, the standard deviation of the differential signal, and the average of the differential signal must satisfy their respective limits before a match is determined. If all three conditions are satisfied for the necessary period of time, the method and apparatus generates an output signal indicating a match. In logging applications, the signal may be used to affect the remote actuation of a whistle or other signaling device to indicate to personnel information concerning the operation of logging equipment.

In a second embodiment of the system, a method and apparatus are provided for determining whether a plurality of tones that are modulated on an input signal have frequencies $f_{in}(J)$ that fall within a desired range surrounding a plurality of reference frequencies $f_r(J)$. To make this determination, the method and apparatus initially generates a plurality of difference signals having frequencies that are equal to the difference between the frequencies $f_{in}(J)$ and $f_r(J)$. Once the difference signals are generated, the instantaneous magnitude and instantaneous phase of the signals are evaluated to determine whether the frequencies of the corresponding tones fall within the desired frequency range. If the frequencies of all of the tones fall within the desired frequency range, the method and apparatus generates an output signal indicating a match. In this manner, multiple tones carried on the input signal may be quickly identified.

There are several advantages to the disclosed method and apparatus over the prior art. The disclosed system ensures accurate tone detection by providing redundant checks to distinguish a received tone from a noise signal. The evaluation of three conditions ensures that noise does not inadvertently trigger a tone detection. Additionally, the disclosed method provides tone detection at quick acquisition rates without the expensive and complex hardware that is typically required in prior art solutions. The disclosed tone decoder also does not require tuning or similar adjustments once the appropriate parameters have been established. Prior solutions typically required a technician to tune the system at startup. Finally, the disclosed method and apparatus allows the identification and determination of multiple tones that are simultaneously modulated on a single carrier wave.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a block diagram of the remote portion of a prior art communications system for actuating a utilization device or operating system;

FIG. 2 is a block diagram of a tone decoder in accordance with the invention that may be used in the communications system of FIG. 1;

FIGS. 4A–4G illustrates the analog representations of an input signal, reference signal, and combinations of the two signals at various stages in the block diagram of FIG. 3;

FIGS. 5A–5I together comprise is a timing diagram illustrating the operation of the tone detection component of FIG. 3;

DETAILED DESCRIPTION OF THE PREFERRED EMBODIMENT

Figure 3:
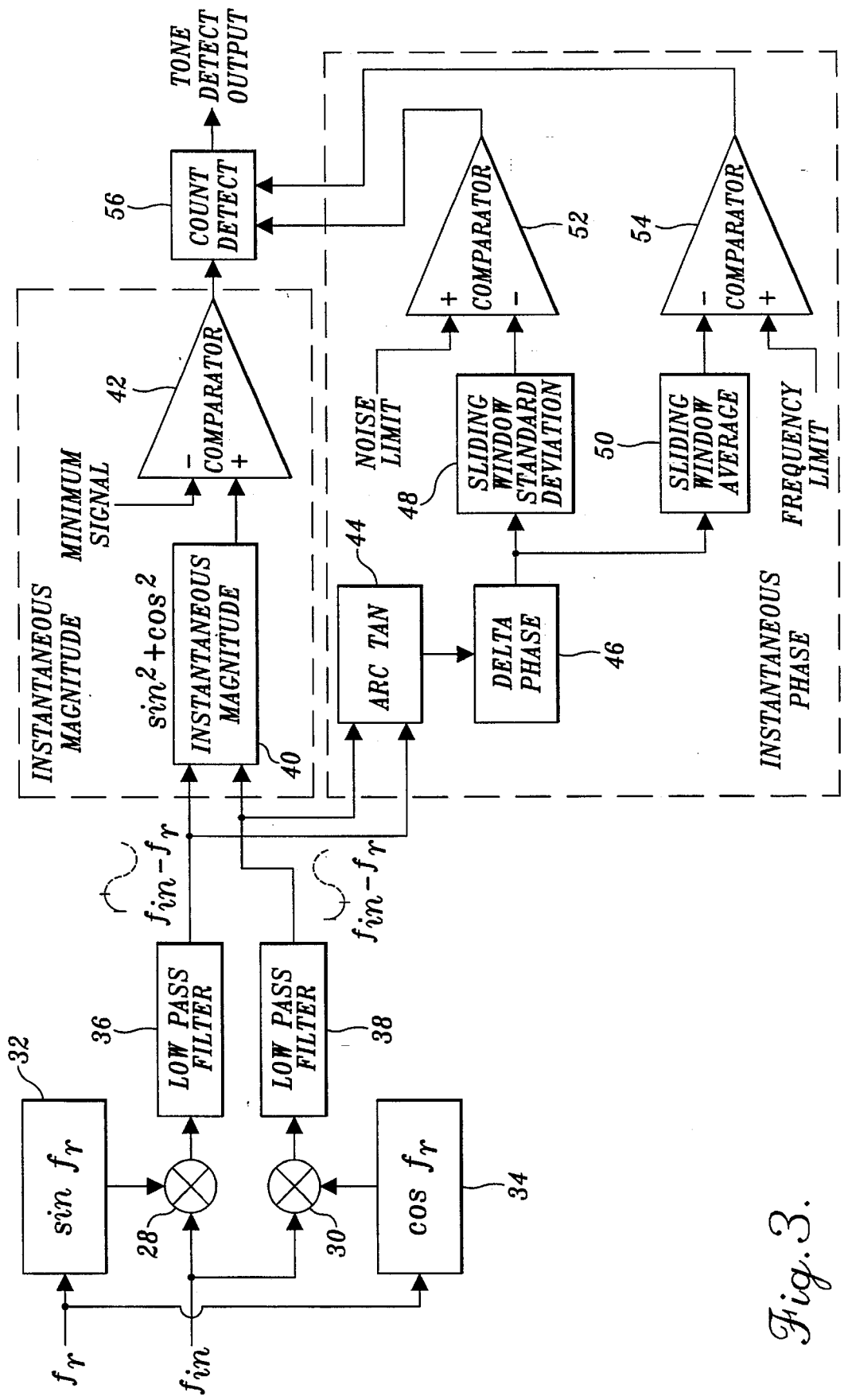
FIG. 3 is block diagram that elaborates on the tone detection component illustrated in FIG. 2.

A prior art tone detection system is shown generally in FIG. 1. An encoded signal, comprising one or more tone signals of predetermined frequency and duration modulated upon an appropriate radio frequency (RF) carrier wave, is picked up by an antenna 10 and applied to a receiver 12. After detection and demodulation in the receiver 12, the tone signals are amplified and applied to a decoder 14. The decoder 14 provides an output signal to actuate an operating system 16 if, and only if, the tone signals supplied to the decoder 14 have the proper coding. A feedback loop 18 couples the operating system 16 to the decoder 14 to indicate to the decoder the target frequency of the tone signal to be evaluated.

The invention is directed toward an improved decoder that offers enhanced speed and accuracy over prior art tone detection systems. Further, the decoder is capable of simultaneously evaluating a number of tones. The tones may be transmitted simultaneously or sequentially. An exemplary tone decoder 20 in accordance with the invention is shown in FIG. 2. The tone decoder includes a bandpass filter 22 which has a pass band that includes the expected range of frequencies to be encoded on an RF carrier wave detected by the tone decoder. More particularly, the range of frequencies is defined by lower and upper frequency limits. In one embodiment, the range is between 500 and 3,000 hertz (Hz). The bandpass filter 22 accepts an input signal having a frequency $f_{in}$ from the receiver 12 and forwards the filtered input to an analog-to-digital (A/D) converter 24 if the input signal falls within the frequency range of the bandpass filter.

The A/D converter 24 changes the filtered input signal from the bandpass filter into digital form for subsequent digital processing by a tone detection component 26. The tone detection component compares the input signal to one or more reference signals. For the purposes of illustration, a single reference signal having a frequency $f_r$ is assumed. The frequency $f_r$ of the reference signal is set to correspond to the nominal or ideal frequency at which tone signal to be detected is to be transmitted. If a tone is present, an indication of such is sent to the operating system 16.

By way of an overview, the tone detection component 26 mixes the input signal with cophase versions of the reference signal, i.e., the reference signal and the reference signal shifted by 90°, and filters this information to produce what will be referred to as a cophase "difference signal." The cophase difference signal is used to calculate the instantaneous magnitude and instantaneous phase of the mixed input and reference signal pairing. An indication of the frequency of the difference signal is determined by differentiating the instantaneous phase. The instantaneous magnitude and frequency calculations are then compared against threshold values to determine (a) the presence of a valid input signal and (b) whether the actual frequency $f_{in}$ of the input signal sufficiently corresponds to the frequency $f_r$ of the reference signal to indicate the presence of a tone.

The tone detection component 26 is illustrated in greater detail in FIG. 3. It is noted that the illustrated functional blocks are preferably implemented in software. However, the tone detection component may also be implemented as a digital signal processor (DSP) chip. A flow diagram of an exemplary software implementation is set forth in FIG. 6A. The digitized input signal from the A/D converter, having a frequency $f_{in}$, is applied to first and second mixers 28 and 30. Digital signal generators 32 and 34 produce sine and cosine versions of the reference signal at the reference frequency $f_r$. As discussed, the value of the reference frequency will depend upon the nominal frequency of the tone to be detected. The outputs of the signal generators are then mixed with the input signal by the mixers 28 and 30 to produce sine and cosine versions of the difference between the input signal frequency $f_{in}$ and the reference signal frequency $f_r$, i.e., $f_{in}-f_r$. This computation was previously termed the difference signal of the mixed input and reference signal pairing.

A pair of low pass filters 36 and 38 process the cophase difference signal to produce output waveforms that are equal to the absolute value of each phase of the difference signal or, in other words, the sine and cosine of $|f_{in}-f_r|$. Each low pass filter has a cutoff frequency that is low enough to pass only the difference signal of the mixed input and reference signal pairing, and yet high enough to allow the filter to respond quickly. In one embodiment, the cutoff frequency is 100 Hz.

Once the calculations at each of the low pass filters are completed, the tone detection component computes the instantaneous magnitude and instantaneous phase of the difference signal. The instantaneous magnitude is computed at block 40 by taking the square of each phase of the difference signal, i.e., the output of each of the filters 36 and 38, and then summing the result. The calculations performed by block 40 may also be represented by the equation:

$$\text{magnitude}=\sin^2|f_{in}-f_r|+\cos^2|f_{in}-f_r| \tag{1}$$

Those skilled in the art will appreciate that the instantaneous magnitude referred to throughout the specification is mathematically the square of the magnitude of the difference signal. Rather than taking the square root of each instantaneous magnitude calculation, greater efficiency is achieved by taking the square of what would otherwise be the appropriate minimum signal threshold. The end result of either calculation method is the same because the two values are used for comparison only.

The instantaneous magnitude is a preliminary check to determine that an input signal that may include an encoded tone is actually present, thus preventing the tone detection component 26 from interpreting noise or other anomalies as a tone. This is accomplished by ensuring that the magnitude of the mixed input and reference signal pairing is above a minimum signal. A comparison of the magnitude and a threshold level established by the minimum signal is made by a comparator 42. The minimum signal may be established through empirical testing and then adjusted to arrive at a limit that ensures suitable performance. The comparator 42 produces a logical one if the magnitude is above the threshold established by the minimum signal and a logical zero if it is not.

The instantaneous phase assessment of the cophase difference signal is calculated at blocks 44 and 46. The instantaneous phase assessment is then used to determine an estimate of the actual frequency of the input signal. The instantaneous phase assessment has a two-fold purpose. First, it allows a double-check to be made against the findings of comparator 42 to ensure that a legitimate signal, and not noise, is being processed by the tone decoder. Second, it allows for fast and accurate determination of the presence or absence of a tone that may be encoded within the input signal.

The instantaneous phase of the difference signal is determined at block 44 by computing the arc tangent of each output from the low pass filters 36 and 38. The arc tangent calculation is a mathematical representation of the changing phase characteristics of the difference signal over time. The output of block 44 is then differentiated at block 46 to produce the "delta phase" (time rate-of-change of the phase), or in other words, the frequency of the cophase difference signal.

The standard deviation of the difference signal frequency or delta phase is computed at block 48. In a preferred embodiment, this parameter is computed on a sliding window basis in which information regarding the most recent delta phase is used along with a fixed number of previously computed delta phases to compute an overall estimate of the standard deviation. In one embodiment, the sliding window is comprised of forty samples. A comparator 52 then compares the standard deviation with a threshold established by a noise limit signal. Again, this is a secondary noise check made in addition to the instantaneous magnitude comparison. The noise limit signal may be established through empirical testing to arrive at a limit that, in conjunction with the magnitude comparison, ensures suitable performance of the tone decoder. The comparator 52 produces a logical one if the standard deviation is below the noise limit signal threshold and a logical zero if it is not.

The mean or average of a number of delta phase determinations is computed at block 50. As with the standard deviation calculation, in a preferred embodiment the delta phase parameters are computed on a sliding window basis.

Upon calculation of the average, a comparator 54 is used to determine whether the average is sufficiently close to the reference signal to establish the presence of a tone. This is accomplished by comparing the average to a frequency limit that represents a maximum acceptable deviation between the input signal frequency $f_{in}$ and the reference signal frequency $f_r$. In one embodiment, frequency limit is set at 5 Hz. Thus, in this embodiment the input signal frequency $f_{in}$ must be within ±5 Hz of the reference signal frequency $f_r$ or the tone is invalid. The comparator 54 produces a logical one if the average is within the range established by the frequency limit and a logical zero otherwise.

The output of each of the comparators 42, 52, and 54 is applied to a count detect logic block 56. The tests applied at each of the three comparators 42, 52 and 54 must pass in order for the tone detection component 26 to positively identify the presence of a tone. Thus, each comparator must be at logical one or a tone will not be indicated. As will be discussed in greater detail, in a preferred embodiment the count detect logic block 56 also incorporates a form of hysteresis in which a tone detection output is produced only if all three outputs from the comparators 42, 52 and 54 are logical one for a predetermined time frame (e.g., 5 milliseconds). Further, if after detecting a tone one of the comparator outputs changes to logical zero for more than a second interval of time (e.g., 20 milliseconds), the count detect logic block will indicate that a tone is no longer present.

FIGS. 4A–4G and 5A–5I illustrate a number of waveforms that are useful in explaining the operation of the tone decoder at various stages in the block diagram of FIG. 3. As will be appreciated, each of the waveforms presented are analog representations of discrete digitized samples, as the functional blocks of FIG. 3 are performed digitally. With reference to FIGS. 4A–4G, a waveform 58 is used to represent an input signal $f_{in}$ that is being received and subsequently processed by the tone decoder. The waveform 58 will be sinusoidal if it is encoded with a single tone, or will take the form of a more complex waveform if multiple tones are simultaneously encoded.

A pair of waveforms 59 and 62 illustrate the sine and cosine versions, respectively, of a cophase reference signal having a frequency $f_r$ that is equal to the nominal frequency of the input signal. In an ideal environment, the frequencies of the input and reference signals would be equivalent. However, in practical applications the two frequencies will differ by up to a few hertz due to limitations in the transmitting and receiving equipment. As an example, fluctuations in the ambient air temperature of the equipment will account for some of the variation.

The cophase reference signal is mixed with the input signal to produce a difference signal represented by waveforms 60 and 63. The low pass filters 36 and 38 process the waveforms 60 and 63, respectively, to produce output waveforms 61 and 64. These waveforms are applied to the instantaneous magnitude and instantaneous phase blocks of FIG. 3.

With reference to FIGS. 5A–5I, each column is representative of an illustrative input signal $f_{in}$ and processing of the input signal by various blocks shown in FIG. 3. Each column is bounded by a pair of timing lines. From left to right, the timing lines are labeled $t_0, t_1, t_2, t_3, t_4,$ and $t_5$. For purposes of clarity in this discussion, it will be assumed that the frequency $f_r$ of the reference signal is 600 Hz. Further, it is assumed that the frequency limit is a window of 10 Hz, i.e., 5 Hz below and above the reference frequency $f_r$. Thus, in this example, the tone decoder will detect the presence of a tone for any input signal having a frequency that falls within the range of 595–605 Hz. The columns in FIGS. 5A–5I are set up as follows:

Column A—refers to a state where there is no input signal and the receiver is picking up noise only.

Column B—refers to a state where the frequency of the input signal is 25 Hz above the frequency of the reference signal, i.e., at 625 Hz.

Column C—refers to a state where the frequency of the input signal is 4 Hz above the frequency of the reference signal, i.e., at 604 Hz.

Column D—refers to a state where the frequency of the input signal is 2 Hz below the frequency of the reference signal, i.e., 598 Hz.

Column E—refers to a state where the receiver is receiving a carrier wave but there is no tone being transmitted.

The following describes the row designations in FIGS. 5A–5I from top to bottom.

| | |
|---|---|
| input signal | represents the signal being received by the tone decoder |
| instantaneous magnitude | represents the instantaneous magnitude of the outputs of the low pass filters (computed at block 40) |
| instantaneous phase | represents the arc tangent of the outputs of the low pass filters (computed at block 44) |
| delta phase (frequency) | represents the derivative of the instantaneous phase (computed at block 46) |
| ABS (delta phase) | represents the absolute value of the delta phase (also computed at block 46) |
| sliding window average | represents the average of a number of delta phase calculations (computed at block 50) |
| sliding window standard deviation | represents the standard deviation of a number of delta phase calculations (computed at block 48) |
| count detect | a count is detected when the results of the instantaneous magnitude, average and standard deviation comparisons are all logical one (determined at block 56) |

In column A, noise 65a being received by the tone decoder is mixed with the cophase reference signal and filtered by the low pass filters 36 and 38. As is indicated by waveform 65b, the instantaneous magnitude of the noise is occasionally above the minimum signal. At the peaks rising above the minimum signal, a logical one is being applied to the count detect by the comparator 42. The sliding window standard deviation and average of the noise are illustrated by waveforms 65c and 65d, respectively. As is shown by the waveform 65c, the standard deviation is above the noise limit, and thus the output of comparator 52 will be logical zero for the time interval $t_0$ to $t_1$. Similarly, throughout $t_0$–$t_1$ the average waveform 65d is above the 5 Hz upper limit established by the frequency limit. Thus, the output of comparator 54 will also be logical zero during this same interval. Because the standard deviation and average outputs remain at logical zero throughout column A, the count remains at a "reject" state, as shown by line 65e.

In column B, an input signal 66a having a frequency of 625 Hz, i.e., 25 Hz above the reference signal frequency, is received by the tone decoder, mixed with the cophase reference signal, and filtered by the low pass filters 36 and 38. After an initial delay, the instantaneous magnitude 66b of the input signal is above the minimum signal throughout $t_1$–$t_2$. Thus, a logical one is being applied to the count detect by the comparator 42. The phase of the input signal, shown by waveform 66c, cycles between −180 and +180 according to the periodicity of its relative frequency. The frequency of the phase, calculated from the instantaneous phase, is 25 Hz above the reference frequency $f_r$. This is shown by line 66d. Since the input signal frequency is above the reference signal frequency, the absolute value of the frequency yields the identical timing diagram, shown at line 66e.

The sliding window standard deviation and average of the input signal are illustrated by waveforms 66f and 66g, respectively. As shown by the waveform 66f, because the input signal is legitimate, i.e., the tone decoder is not simply decoding noise, the standard deviation of the waveform is below the noise limit throughout the time interval $t_1$ to $t_2$. As a result, the output of comparator 52 will be logical one. In contrast, the average frequency is well above the 5 Hz threshold. The output of comparator 54 will thus be logical zero during this same interval. Because the average output remains at logical zero throughout $t_1$–$t_2$, the count remains at the reject state as shown by line 66h.

With reference to column C, an input signal 67a having a frequency of 604 Hz, i.e., 4 Hz above the reference signal frequency, is received by the tone decoder, mixed with the cophase reference signal, and filtered by the low pass filters 36 and 38. Since the input signal is within the assumed frequency limit, the tone decoder should indicate the presence of a tone. As can be seen, the instantaneous phase 67b of the input signal is above the minimum signal throughout the time interval $t_2$ to $t_3$. Thus, a logical one is being applied to the count detect by the comparator 42. As expected, the frequency of the phase is computed to be 4 Hz above the reference frequency $f_r$, as is indicated by line 67c. Since the input signal frequency is above the reference signal frequency, the absolute value of the frequency yields the identical timing diagram. This is shown at line 67d.

The sliding window standard deviation and average of the input signal are illustrated by waveforms 67e and 67f, respectively. As illustrated by the waveform 67e, the standard deviation of the waveform is below the noise limit throughout the time interval $t_2$–$t_3$. The output of comparator 52 will consequently be logical one. As illustrated by waveform 67f, the average frequency is slightly below the 5 Hz threshold. As a result, the output of comparator 54 will also be logical one.

The outputs of the instantaneous magnitude, standard deviation and average comparators indicate that a valid tone is present just after time $t_2$. At this point, the count detect block 56 registers a first "step" in indicating that a valid tone is present. This is shown near the beginning of waveform 67g. In the embodiment shown, the count detect is set up as follows. Valid tone indications (accepts) begin to count up beginning at zero to an established maximum number. Conversely, no-tone indications count down from zero, to an established minimum (negative) number. A "tone present" is not indicated by the tone decoder until the number of detects reaches the maximum. Thereafter, the tone will continue to be indicated until the number of rejects is at or below the minimum number. In this manner, erroneous "no-tone" indications will not jeopardize the operation of the tone decoder. The sensitivity to such phenomenon may be varied by changing the pre-established maximum and minimum levels.

At the next test cycle, the comparator outputs will again all be logical one, and the count detect will increment the count by one. This occurs with each successive test cycle until the count number is above the pre-established maximum number that ensures a tone is present. In FIGS. 5A–5I, five steps are shown. Upon reaching the pre-established number, the tone detect becomes high, thereby indicating that a tone has indeed been detected. This is illustrated by line 67h. The tone detect remains high for the remainder of the time interval $t_2$–$t_3$.

Column D illustrates an input signal 68a that has a frequency of 598 Hz, or 2 Hz below the reference signal frequency. Without going into undue detail, because the frequency of the input signal is within the frequency limit, the presence of a tone continues to be indicated by the count detect and tone detect throughout the time interval $t_3$–$t_4$. It is noted, however, that the slope of the phase of the input signal is negative instead of positive. This is indicated by waveform 68b. The slope is negative because the input signal frequency is below the reference signal frequency. In contrast, the slopes of the instantaneous phase waveforms in columns B and C were positive because the input signal frequencies were above the reference signal frequency.

With reference to column E, as indicated by the line 69a, the tone decoder is receiving a carrier wave but there is no tone being transmitted. Each of the comparators will begin to output a logical zero shortly after time $t_4$. As a result, the count detect circuit begins to count the number of non-tone indications or "rejects" received, staring at zero. After the pre-established number of rejects have been counted, the tone detect output is toggled from a "tone is present" indication to a no-tone indication. The detect count remains at the minimum level. All outputs are now at a steady state.

Figure 6A:
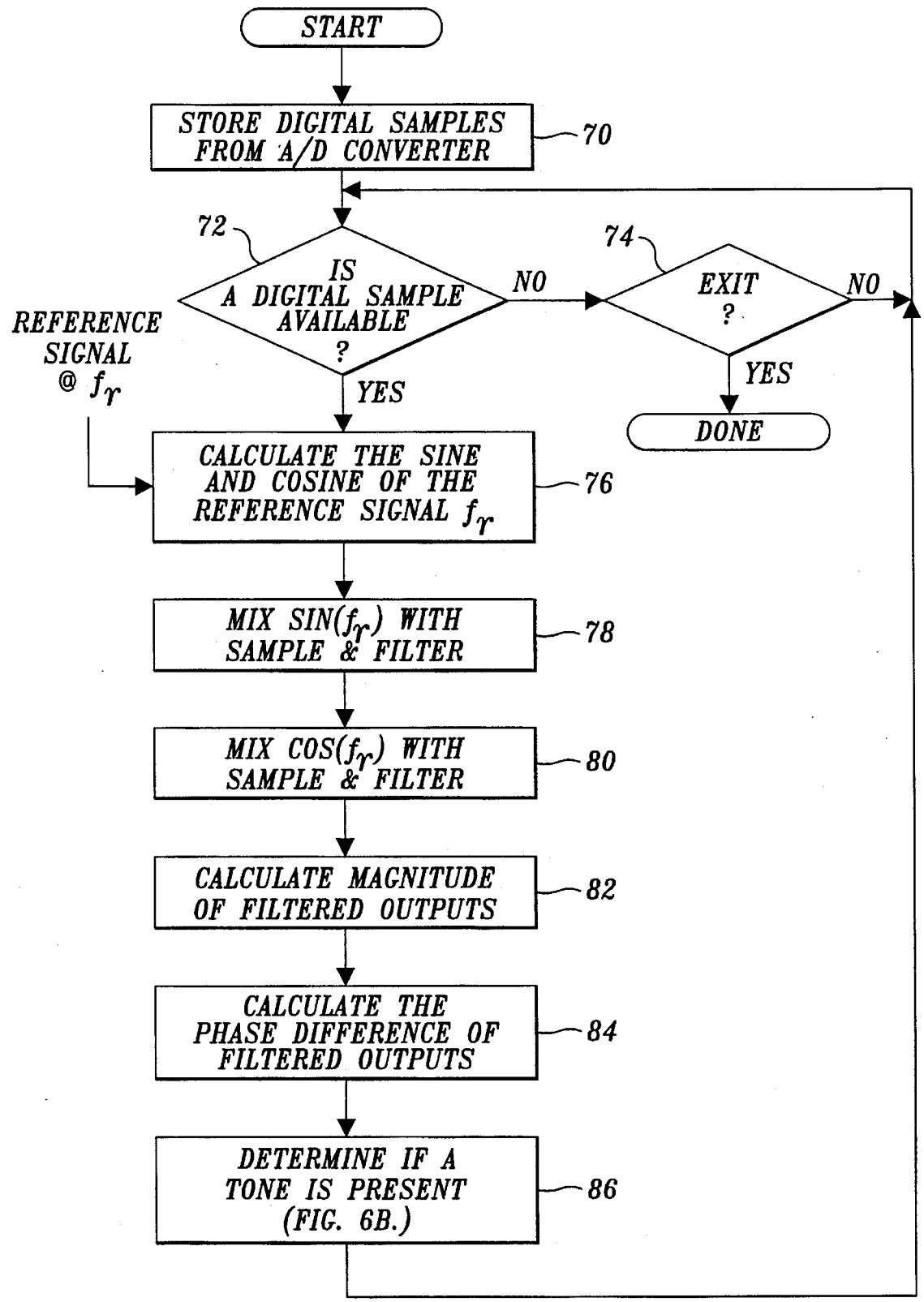
FIG. 6A is a flow diagram of a first exemplary routine for implementing the tone detection component of FIG. 3.

FIG. 6A is a flow diagram illustrating a routine suitable for implementing in software the tone detection component 26 of FIG. 3. At block 70, a buffer is used to store digital samples of the input signal $f_{in}$ after it has been converted by the A/D converter 24. Block 70 is really an interrupt procedure that occurs periodically as data becomes available from the A/D converter. It is shown in the flow diagram of FIG. 6A for completeness. At block 72 a test is made to determine if a digital sample is available. If a digital sample is not available, at block 74 a test is made to determine if the routine is to be terminated, e.g., when power to the tone decoder is disabled or through an end-of-session key. If the routine is not to be terminated, the routine loops back to block 72 and waits for a digital sample.

Once a digital sample is available, the sine and cosine of the reference signal are calculated at block 76. At block 78, the sine of the reference signal is mixed with the current sample and filtered through a low pass filter. At block 80, the cosine of the reference signal is mixed with the current sample and also filtered through a low pass filter. The instantaneous magnitude of the filtered outputs from blocks 78 and 80 is calculated at block 82.

Figure 6B:
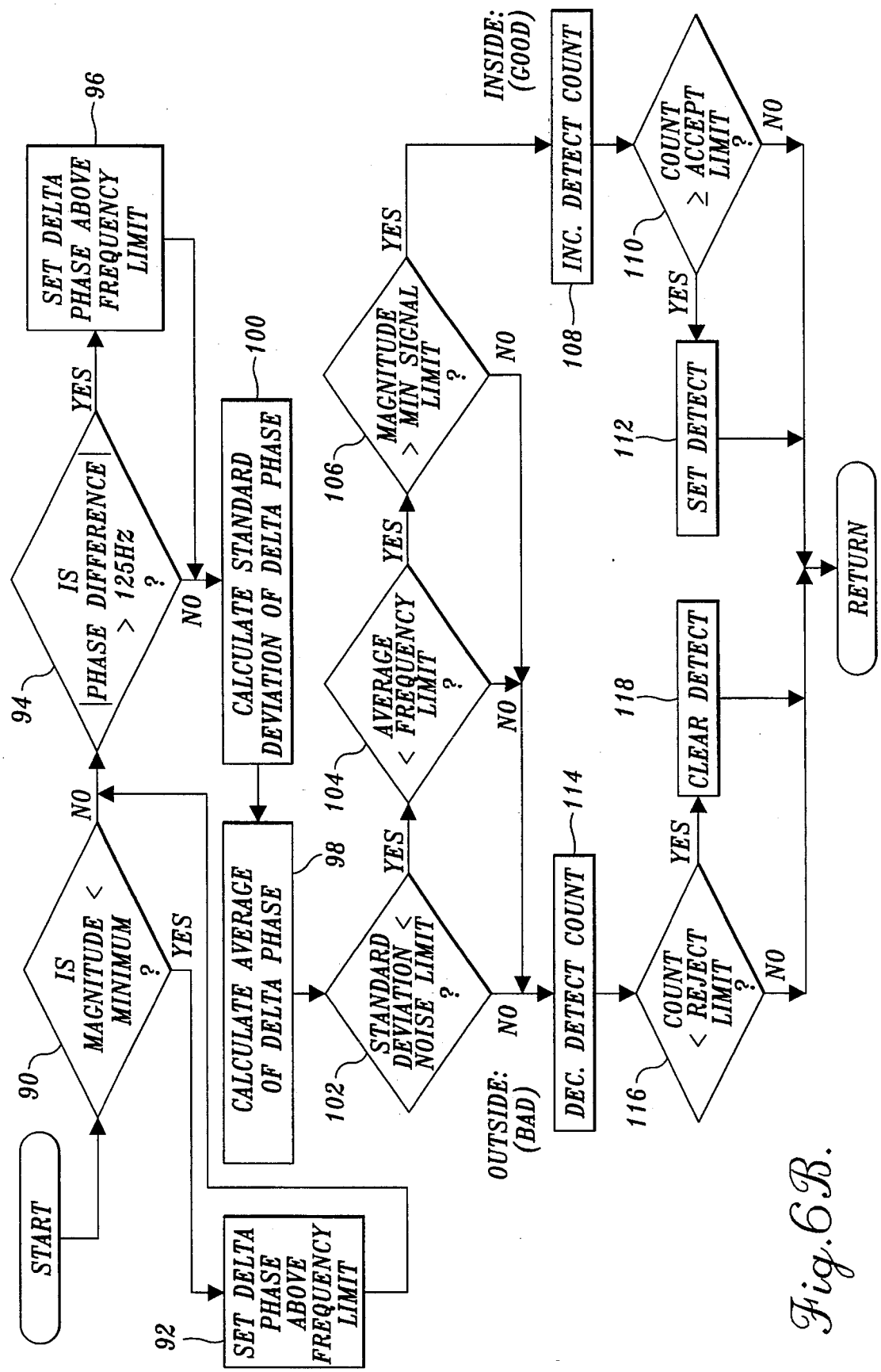
FIG. 6B is a flow diagram of a routine for determining whether a tone is present after the input signal has been mixed with a reference signal and subsequently filtered as indicated in FIG. 6A.

At block 84, the instantaneous phase difference and frequency of the filtered outputs from blocks 78 and 80 are calculated by (1) determining the arc tangent of the filtered outputs to produce the phase of $(f_{in}-f_r)$ as a function of time and (2) differentiating the phase of $(f_{in}-f_r)$ to produce the delta (time rate of change) phase, or the frequency of the phase. At block 86, the instantaneous magnitude and delta phase calculations are used to determine whether a tone is present. A flow diagram illustrating a subroutine suitable for making this determination is illustrated in FIG. 6B. Once the tone determination is made, the routine loops back to block 72.

With reference to FIG. 6B, at block 90 a test is made to determine whether the magnitude of the filtered outputs is less than a minimum level needed to verify that the phase information of the signal will accurately reflect the signal's characteristics. If the magnitude is less than the minimum level, the delta phase is set at block 92 to a substitute value such that the average of all of the sliding window calculations that include the substitute value will necessarily be above the frequency limit. The test for the frequency limit determination is made at block 104 and described below. As an example, if the sliding window is looking at 40 values, a positive frequency limit determination will not be possible until the substitute value has cycled through all of the 40 values, i.e., 40 samples will be required. Block 90 is included because some signals may have a magnitude that is so small that the phase information is erroneous. Thus, through block 92, the tone decoder will not interpret such erroneous information about such signals.

Once the delta phase has been set at block 92, or if the magnitude was greater than or equal to the minimum level, a test is made at block 94 to determine whether the absolute value of the delta phase is greater than a predetermined value, e.g., 125 Hz. If the phase difference is greater than the predetermined value, the delta phase is set at block 96 to the predetermined value or some similar value such that the average of all of the sliding window calculations that include the predetermined value will be above the frequency limit determination made at block 104. Block 94 is included to prevent arithmetic overflow that may occur while calculating the sliding window average and standard deviation if the delta phase value is too great. Once the delta phase has been set at block 96, or if the absolute value of the phase difference was less than or equal to the predetermined limit, the standard deviation and average of a number of delta phase values are calculated on a sliding window basis at blocks 98 and 100.

At this point in the routine, the standard deviation, average, and magnitude calculations are all available, and all that is required in the tone determination is a comparison of these values with the established acceptable limits. To this end, at block 102 a test is made to determine whether the standard deviation is less than the noise limit. If the standard deviation is less than the noise limit, a test is made at block 104 to determine whether the average of the delta phase is less than the frequency limit. If the standard deviation is less than the noise limit, and the average of the delta phase is less than the frequency limit, a test is made at block 106 to determine whether the magnitude is less than the minimum signal limit.

The meeting of all of the conditions set forth in blocks 102, 104, and 106 is an indication that a valid tone is present. However, in a preferred embodiment of the invention discussed above, a hysteresis is employed such that each of the conditions must be met for a predetermined number of counts. Thus, at block 108, the variable count detect is incremented. At block 110, a test is made to determine whether the value of the count detect is greater than or equal to a predetermined acceptable limit, e.g., such as 10, thereby indicating the presence of a tone. If the count detect is above or equal to the acceptable limit, a tone detect variable "detect" is set at block 112. Upon setting of the variable detect, or if the count was less than the acceptable limit, the routine returns to block 72 of FIG. 6A.

If any one of the tests in blocks 102–106 fail, i.e., the standard deviation is greater than or equal to the noise limit, the average is greater than or equal to the frequency limit, or the magnitude is less than or equal to the minimum signal, there may not be a valid tone, and the count variable is decremented at block 114. At block 116, a test is made to determine whether the value of count is less than a reject limit, which may be, for example, set at 20. If the reject limit is met, the variable detect is cleared at block 118. Upon clearing the variable detect, or if the count detect was less than or equal to the reject limit, the subroutine returns to block 72 of FIG. 6A.

Figure 7:
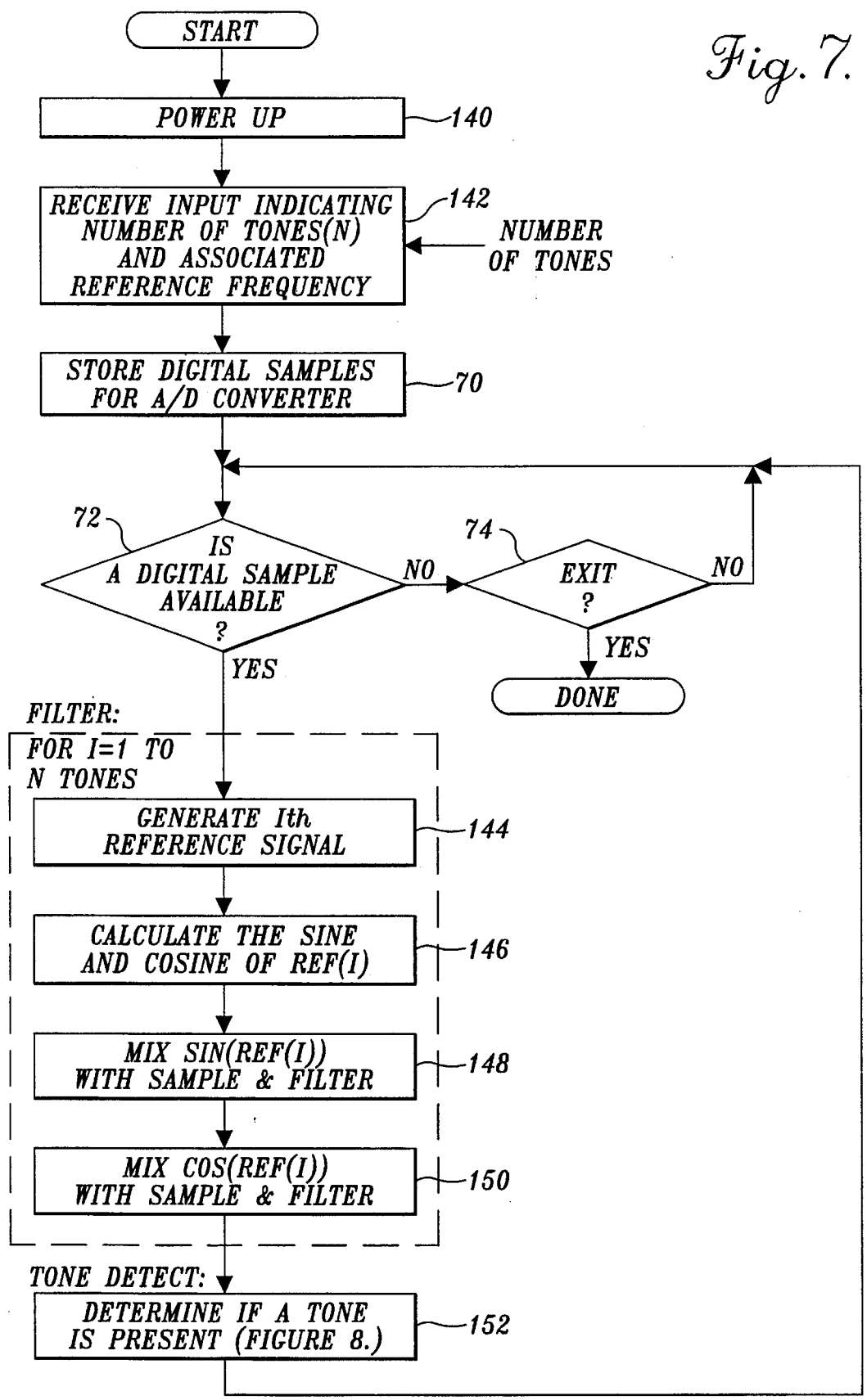
FIG. 7 is a flow diagram of a second exemplary routine for implementing the tone detection component of FIG. 3 that may be used to simultaneously detect multiple tones.

FIG. 7 is a flow diagram illustrating a second exemplary routine suitable for providing a software implementation of the tone detection component 26 illustrated in FIG. 3. The routine of FIG. 7 differs from that of FIGS. 6A and 6B in that it includes steps for interpreting multiple tones modulated on the carrier wave comprising the input signal. The tones may be transmitted simultaneously or in a type of sequential fashion. Three variables are used in the routine. Variable N is representative of the number of tones that are to be scanned by the tone decoder. Variables I and J are counter variables that will range from one to N tones, with I representative of the current reference signal being computed and J representative of the current tone under consideration.

A number of the steps in FIG. 7 are identical to those in FIGS. 6A and 6B, and are referenced by the same numerals. At block 140 the tone decoder implements a start-up procedure which includes, for example, the running of a self test to ensure proper operation of the decoder and the initialization of the variables I, J and N. At block 142, the number of tones (N) to be decoded and each tone's associated reference frequency are input into the tone decoder. As in FIG. 6A, blocks 70–74 perform the functions of storing digital samples from the A/D converter, determining whether a digital sample is available and, when a digital sample is available, forwarding the digital sample to the remainder of the routine.

Figure 8:
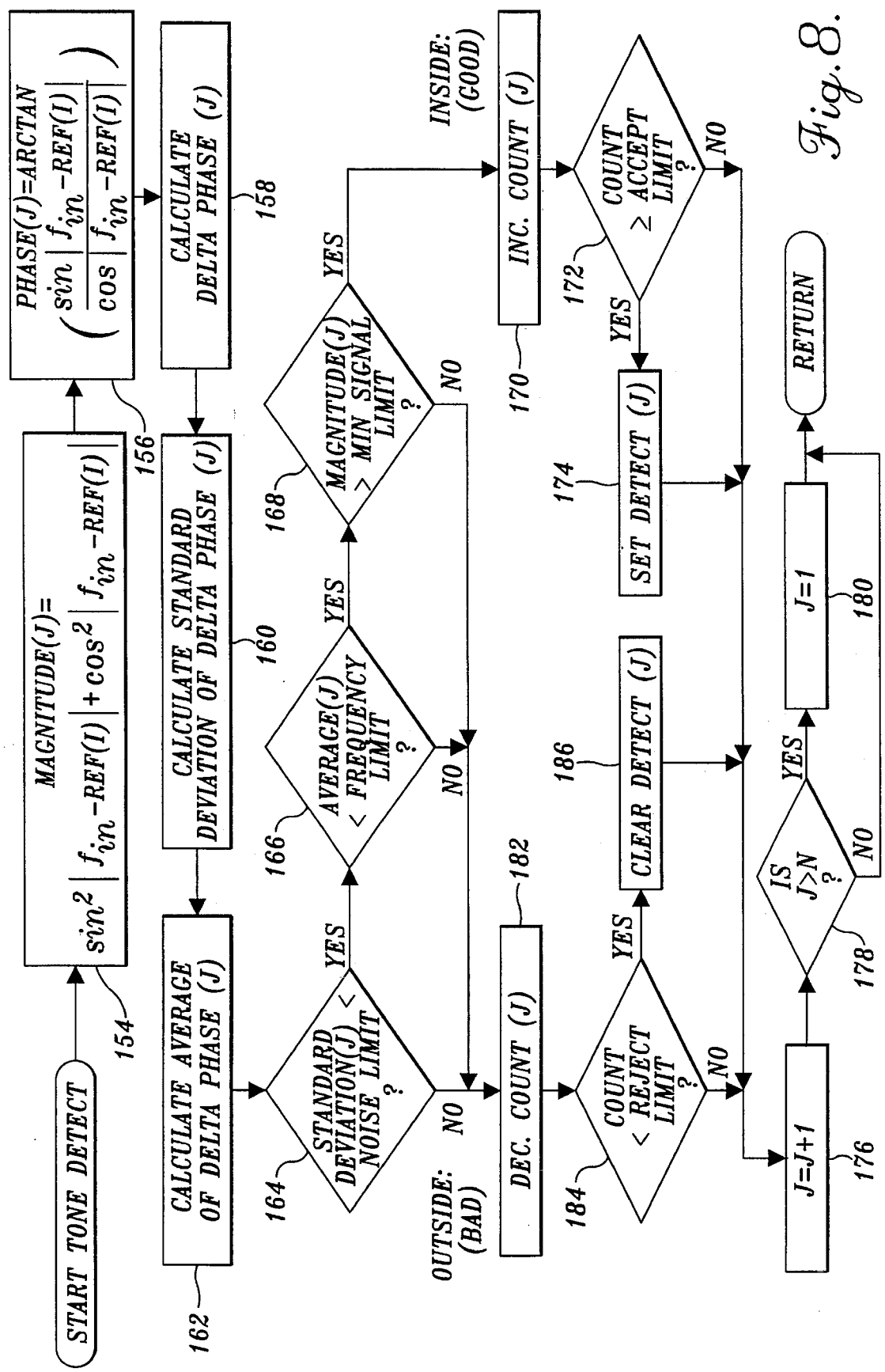
FIG. 8 is a flow diagram of a routine for determining whether one or more tones are present after the parameters for each potential tone have been determined in FIG. 7.

The remaining steps in FIG. 7 may be separated into two fundamental sections: a FILTER section carried out in blocks 144–150 and a TONE DETECT section, indicated in block 152, which is elaborated on in the routine of FIG. 8. Concentrating on the FILTER section, the loop comprising blocks 144–150 is carried out from I=1 to the number of N tones using a digital sample from block 70. The loop begins at block 144 by generating the reference signal for the $I^{th}$ tone. Referred to as REF(I) in the figures, it will be appreciated from the discussion above that the $I^{th}$ reference signal will have a frequency that is equal to the nominal frequency of the $I^{th}$ tone.

The sine and cosine of the reference signal REF(I) are calculated at block 146. At block 148, the sine of the reference signal REF(I) is mixed with the current sample and filtered through a low pass filter. This will yield the sine of $|f_{in}-REF(I)|$. At block 150, the cosine of the reference signal REF(I) is mixed with the current sample and also filtered through a low pass filter. This will yield the cosine of $|f_{in}-REF(I)|$. The routine loops to block 144 until all of the calculations for the N tones have been accomplished. Once this is achieved, it is determined whether one of the N tones is present at block 152 by calling the subroutine of FIG. 8. The routine then loops to block 72.

The loop comprising blocks 144–150 must be accomplished at a relatively fast pace in order to properly analyze the generated reference signals that are mixed and filtered with digital samples of the input signal. As will be appreciated by those skilled in the art, a theorem for sampling utilizing the Nyquist rate generally states that a sine wave must be sampled at a rate of at least twice its frequency in order to accurately determine the characteristics of the waveform. For this reason, the routine of FIG. 7 is designed to perform the filtering calculations for each of the N tones and thereafter compare these parameters to characteristics indicative of only one of the N tones. Comparisons for each tone are performed in turn. Along this line, variable J in FIG. 8 is used to track which of the N tones is under consideration when the subroutine is called. Thus, throughout the following discussion J will refer to the tone currently of interest.

At blocks 154 and 156 the magnitude and phase of the tone of interest are calculated, respectively, using the following equations:

$$\text{Magnitude } (J) = \sin^2 |f_{in} - \text{REF}(I)| + \cos^2 |f_{in} - \text{REF}(I)| \quad (2)$$

$$\text{Phase } (J) = \text{ARCTAN}\left(\frac{\sin|f_{in} - \text{REF}(I)|}{\cos|f_{in} - \text{REF}(I)|}\right) \quad (3)$$

Its is noted that it may be more efficient to calculate equations (2) and (3) within the Filter block. The calculations would be made only when I is equal to J. This is because the recently computed magnitude and phase values for the variable J will be present in short-term registers having very quick access times.

At block 158, the delta phase (I) or derivative of the instantaneous phase of the reference signal for the tone of interest is determined. Except for the blocks pertaining to incrementing or resetting the variable J, the remaining blocks in FIG. 8 are similar and have identical functions as the blocks 98–118 set forth in FIG. 6B. It should be noted that it may be desirable to include blocks 90–96 in the routine of FIG. 8.

To reiterate the functionality of these blocks for multiple tones, at blocks 160 and 162 the standard deviation and average of a number of delta phase (J) values are calculated on a sliding window basis. At block 164 a test is made to determine whether the standard deviation (J) is less than the noise limit. If the standard deviation is less than the noise limit, a test is made at block 166 to determine whether the average (J) of the delta phase is less than the frequency limit. If the standard deviation (J) is less than the noise limit, and the average (i) is less than the frequency limit, a test is made at block 164 to determine whether the magnitude (J) is less than the minimum signal limit.

If all of the conditions set forth in blocks 164, 166, and 168 are met, the variable count (J) is incremented at block 170. At block 172, a test is made to determine whether the value of the count (J) is greater than or equal to a predetermined acceptable limit, thereby indicating the presence of a tone. If the count is above or equal to the limit, the variable detect (J) is set at block 174. Upon setting of the variable detect (J), or if the count (J) was less than the acceptable limit, variable J is incremented at block 176. At block 178, a test is made to determine if this is the last tone to be considered. If it is, variable J is reset at block 180. Upon resetting J, or if there are more tones to be considered, the subroutine returns to block 72 of FIG. 7.

If any one of the tests in blocks 164–168 fail, i.e., the standard deviation (J) is greater than or equal to the noise limit, the average (I) is greater than or equal to the frequency limit, or the magnitude (J) is less than or equal to the minimum signal, the tone under consideration may not be present, and the count (J) is decremented at block 182. At block 184, a test is made to determine whether the value of count (J) is less than a reject limit. If count (J) is greater than the reject limit, it is cleared at block 186. Upon clearing count (J), or if the count (J) was less than or equal to the reject limit, the routine branches to 176 where it is determined which tone to consider the next time the subroutine is called. The subroutine then returns to block 72 of FIG. 7.

As will be appreciated from the foregoing, the tone decoder has a number of advantages over prior art decoders. The disclosed system allows accurate tone detection at quick acquisition rates without the expense of complex hardware that is typically required in prior art solutions. The instantaneous magnitude comparison is used to make sure that a valid encoded signal is being processed and not simply a noise signal whose phase information might be incorrectly interpreted as a tone.

The computation of the standard deviation of the frequency of the difference signal serves as a secondary check for noise. Because noise could theoretically have an average that is less than the noise limit, and at the same time have a magnitude that is above the minimum signal limit, such a noise sample could inaccurately indicate the presence of a tone. The standard deviation calculation looks to how much the input signal is varying, and, if the standard deviation is less than the noise limit, an indication that the magnitude and average results are due to an encoded tone and not noise is sent to the count analysis component.

Once the presence of a valid signal has been positively established, the determination of the average frequency and subsequent comparison to a frequency range centered around the reference frequency provides a very fast and accurate indication if a tone is present. The use of hysteresis in the average and standard deviation calculations provides a further measure of assurance in any tone determination. Another advantage is that the tone decoder does not require tuning or similar adjustments once the appropriate parameters have been established. Prior solutions typically required a technician to tune the system at startup. Finally, the ability to look for multiple tones simultaneously allows greater flexibility in tone encoding schemes.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of decoding a signal to detect the presence of a tone having a frequency within a desired range surrounding a specified reference frequency $f_r$, the method comprising the steps of:

(a) receiving an input signal having a frequency $f_{in}$;

(b) producing a difference signal having a frequency that is equal to the difference between the frequencies $f_{in}$ and $f_r$;

(c) employing information about the difference signal at more than one phase angle to determine the instantaneous magnitude and instantaneous phase of the difference signal;

(d) determining whether the instantaneous magnitude of the difference signal is greater than a predetermined minimum signal threshold;

(e) calculating the frequency of the difference signal from the instantaneous phase;

(f) calculating the standard deviation of a plurality of frequency calculations and determining whether the standard deviation is less than a predetermined noise limit;

(g) calculating the average of a plurality of frequency calculations and determining whether the average is less than a predetermined frequency limit; and (h) generating a detection output signal indicating the presence of the tone if the instantaneous magnitude is greater than the predetermined minimum signal threshold, the standard deviation is less than the predetermined noise limit, and the average is less than the predetermined frequency limit.

2. The method of claim 1, wherein the standard deviation is computed on a sliding window basis.

3. The method of claim 1, wherein the step of averaging is executed on a sliding window basis.

4. A tone detector for detecting whether the frequency $f_{in}$ of a received signal is within a desired frequency range surrounding a reference signal having a frequency $f_r$, the tone detector comprising:
   (a) a receiver for receiving an input signal having a frequency $f_{in}$;
   (b) means for generating a difference signal having a frequency that is equal to the difference between the frequencies $f_{in}$ and $f_r$;
   (c) instantaneous magnitude means for calculating an instantaneous magnitude of the difference signal, comparing the instantaneous magnitude of the difference signal with a minimum signal threshold, and generating a first output signal when the instantaneous magnitude of the difference signal is greater than the minimum signal threshold;
   (d) instantaneous phase means for calculating an instantaneous phase of the difference signal and determining a frequency of the difference signal from the instantaneous phase of the difference signal;
   (e) averaging means for calculating an average of the frequency of the difference signal, comparing the average of the frequency with a frequency limit threshold, and generating a second output signal when the average of the frequency of the difference signal is less than the frequency limit threshold;
   (f) standard deviation means for calculating a standard deviation of the frequency of the difference signal, comparing the standard deviation with a noise limit threshold, and generating a third output signal when the standard deviation of the difference signal is less than the noise limit threshold; and
   (g) a detector for monitoring the output signals of the instantaneous magnitude means, the averaging means, and the standard deviation means, the detector generating a detection signal indicating the received input signal is within the desired frequency range when the first, second, and third output signals are present.

5. The tone detector of claim 4, wherein the means for generating a difference signal comprises:
   (a) means for providing cophase reference signals having components R1 and R2 of frequency $f_r$ and being offset in phase by 90°;
   (b) a mixer for mixing the received signal with the reference signal R1 to provide a first output signal and for mixing the received signal with the reference signal R2 to provide a second output signal, the first and the second output signals having a frequency that is equal to the difference between frequencies $f_{in}$ and $f_r$ and a phase relationship that is offset by 90°; and
   (c) a low pass filter for filtering the first and second output signals to produce first and second low pass filtered signals, the first and second low pass filtered signals representing different phases of the difference signal.

6. The tone detector of claim 4, wherein the instantaneous magnitude means comprises:
   (a) means for squaring the first and second low pass filtered signals; and
   (b) a summer for summing the square of the first low pass filtered signal with the square of the second low pass filtered signal to calculate the instantaneous magnitude of the difference signal.

7. The tone detector of claim 6, wherein the instantaneous magnitude means further comprises a comparator for comparing the instantaneous magnitude of the difference signal with the minimum signal threshold, the comparator generating a first output signal when the instantaneous magnitude of the difference signal is greater than the minimum signal threshold.

8. The tone detector of claim 4, wherein the instantaneous phase means further comprises:
   (a) means for calculating the arc tangent of the first and second low pass filtered signals to produce an instantaneous phase signal; and
   (b) a differentiator to differentiate the instantaneous phase signal to produce a differential signal indicative of the frequency of the difference signal.

9. The tone detector of claim 8, wherein the differentiator further comprises means for taking the absolute value of the differential signal.

10. The tone detector of claim 9, wherein the standard deviation means comprises:
    (a) means for calculating a standard deviation of the differential signal over a preselected period of time; and
    (b) a comparator for comparing the standard deviation of the differential signal with a noise limit threshold, the comparator generating the second output signal when the standard deviation of the differential signal is less than the noise limit threshold.

11. The tone detector of claim 10, wherein the means for calculating the standard deviation of the differential signal uses a sliding window.

12. The tone detector of claim 9, wherein the averaging means comprises:
    (a) means for calculating an average of the differential signal over a preselected period of time; and
    (b) a comparator for comparing the average of the differential signal with a frequency limit threshold, the comparator generating the third output signal when the average of the differential signal is less than the frequency limit threshold.

13. The tone detector of claim 12, wherein the means for calculating an average of the differential signal uses a sliding window.

14. The tone detector of claim 4, wherein the detector generates a detection signal when the first, second, and third output signals are present for a preselected period of time.

15. A method of detecting whether the frequencies $f_{in}(J)$ of a plurality of received tones modulated on an input signal are within a desired frequency range surrounding a plurality of reference signals having frequencies $f_r(J)$, "J" being equal to the number of tones modulated on the carrier wave, the method comprising the steps of:
    (a) generating a plurality of difference signals, each of the plurality of difference signals having a frequency that is equal to the difference between the frequencies $f_{in}(J)$ and $f_r(J)$ for each of the plurality of tones;
    (b) testing each of the plurality of difference signals by:
       (i) selecting one of the plurality of difference signals;
       (ii) employing information about the selected difference signal to determine the instantaneous magnitude and instantaneous phase of the selected difference signal;
       (iii) producing a first output(J) when the instantaneous magnitude of the selected difference signal is greater than a preselected minimum signal level;
       (iv) calculating the frequency of the selected difference signal from the instantaneous phase of the selected difference signal;
       (v) producing a second output(J) when the calculated frequency is within a predetermined frequency range; and (vi) repeating steps (i)–(v) for each of the plurality of difference signals; and (c) generating a detection output signal when the first and second outputs(J) are present for each of the plurality of difference signals, said detection output signal indicating that the plurality of tones modulated on the carrier wave are within a desired frequency range surrounding the plurality of reference signals.

16. The method of claim 15, wherein the detection output signal is produced if the first and second outputs are present for a preselected minimum period of time.

17. The method of claim 15, wherein the step of producing a second output (J) comprises the steps of:

(a) calculating an average of the frequency of the selected difference signal;

(b) comparing the average of the frequency of the selected difference signal with a preselected frequency limit; and (c) producing the second output (J) if the average of the frequency of the selected difference signal is less than the preselected frequency limit.

18. The method of claim 17, wherein the average of the frequency of the selected difference signal is calculated using a sliding window.

19. The method of claim 15, wherein the step of producing a second output comprises the steps of:

(a) calculating a standard deviation and an average of the frequency of the selected difference signal;

(b) comparing the average of the frequency of the selected difference signal with a preselected frequency limit;

(c) comparing the standard deviation of the frequency of the selected difference signal with a preselected noise limit; and (d) producing the second output (J) if the average of the frequency of the selected difference signal is less than the preselected frequency limit and the standard deviation of the frequency of the selected difference signal is less than a preselected noise limit.

20. The method of claim 19, wherein the average of the frequency of the selected difference signal is calculated using a sliding window.

21. The method of claim 19, wherein the standard deviation of the frequency of the selected difference signal is calculated using a sliding window.

22. A tone detector for detecting the presence of a plurality of tones modulated on a carrier wave, the tone detector determining whether the frequency $f_{in}(J)$ of each of the plurality of received tones falls within a desired frequency range surrounding a plurality of reference signals having frequencies $f_r(J)$, "J" being equal to the number of tones modulated on the carrier wave, the tone detector comprising:

(a) means for generating a plurality of difference signals, each of the plurality of difference signals having a frequency that is equal to the difference between the frequencies $f_{in}(J)$ and $f_r(J)$ for each of the plurality of tones;

(b) means for testing each of the plurality of difference signals by:

(i) selecting one of the plurality of difference signals;

(ii) employing information about the selected difference signal to determine the instantaneous magnitude and instantaneous phase of the selected difference signal;

(iii) producing a first output(J) when the instantaneous magnitude of the selected difference signal is greater than a preselected minimum signal level;

(iv) calculating the frequency of the selected difference signal from the instantaneous phase of the selected difference signal;

(v) producing a second output(J) when the calculated frequency is within a predetermined frequency range; and (vi) repeating steps (i)–(v) for each of the plurality of difference signals; and (c) a detector for monitoring the first and second outputs(J) and generating a detection signal when the first and second outputs (J) are present for each of the plurality of difference signals, the detection signal indicating that the frequencies $f_{in}(J)$ of the tones modulated on the input signal are within the desired frequency range surrounding the frequencies $f_r(J)$.

23. The tone detector of claim 22, wherein the detector generates a detection signal if the first and second outputs (J) for each of the plurality of difference signals are present for a preselected minimum period of time.

24. The tone detector of claim 22, wherein the means for testing each of the plurality of difference signals produces a second output (J) by:

(a) calculating an average of the frequency of the selected difference signal;

(b) comparing the average of the frequency of the selected difference signal with a preselected frequency limit; and (c) producing the second output (J) if the average of the frequency of the selected difference signal is less than the preselected frequency limit.

25. The tone detector of claim 24, wherein the average of the frequency of the selected difference signal is calculated using a sliding window.

26. The tone detector of claim 22, wherein the means for testing each of the plurality of difference signals produces a second output (J) by:

(a) calculating a standard deviation and an average of the frequency of the selected difference signal;

(b) comparing the average of the frequency of the selected difference signal with a preselected frequency limit;

(c) comparing the standard deviation of the frequency of the selected difference signal with a preselected noise limit; and (d) producing the second output (J) if the average of the frequency of the selected difference signal is less than the preselected frequency limit and the standard deviation of the frequency of the selected difference signal is less than a preselected noise limit.

27. The tone detector of claim 26, wherein the average of the frequency of the selected difference signal is calculated using a sliding window.

28. The tone detector of claim 26, wherein the standard deviation of the frequency of the selected difference signal is calculated using a sliding window.

* * * * *